United States Patent
Jayaraman (10) Patent No.: US 7,185,299 B1
(45) Date of Patent: Feb. 27, 2007

(54) METHODS OF ESTIMATING ROUTING DELAYS DURING THE PLACEMENT PROCESS IN PROGRAMMABLE LOGIC DEVICES

(75) Inventor: Rajeev Jayaraman, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 804 days.

(21) Appl. No.: 10/354,810

(22) Filed: Jan. 30, 2003

(51) Int. Cl.
*G06F 9/45* (2006.01)
*G06F 17/50* (2006.01)

(52) U.S. Cl. ............ 716/6; 716/4; 716/5; 716/16
(58) Field of Classification Search ............ 716/4–14, 716/16
See application file for complete search history.

(56) References Cited

U.S. PATENT DOCUMENTS

| | | | | |
|---|---|---|---|---|
| 5,218,551 A * | 6/1993 | Agrawal et al. | ............ | 716/10 |
| 5,237,514 A * | 8/1993 | Curtin | ............ | 716/10 |
| 5,521,837 A * | 5/1996 | Frankle et al. | ............ | 716/10 |
| 5,870,309 A * | 2/1999 | Lawman | ............ | 716/6 |
| 6,263,478 B1 * | 7/2001 | Hahn et al. | ............ | 716/10 |
| 6,272,668 B1 * | 8/2001 | Teene | ............ | 716/10 |
| 6,385,760 B2 * | 5/2002 | Pileggi et al. | ............ | 716/8 |
| 6,763,506 B1 * | 7/2004 | Betz et al. | ............ | 716/6 |

* cited by examiner

*Primary Examiner*—Paul Dinh
*Assistant Examiner*—Nghia M. Doan
(74) *Attorney, Agent, or Firm*—Lois D. Cartier; LeRoy D. Maunu (57) ABSTRACT

Methods of estimating routing delays between two points in a programmable logic device (PLD). The invention takes advantage of the fact that there are a finite number of possible routes (routing paths) between any two points in a PLD. In PLDs with a regular and tiled structure, such as field programmable gate arrays, the number of routes between any two points that are likely to be used by the router is relatively small. Thus, given the locations of the two points to be connected, the route most likely to be used by the router can be determined, and an associated delay can be calculated. This associated delay is then reported as the estimated routing delay. This method of delay estimation can be much more accurate than using an average delay. When the delays between possible paths vary widely, the actual delay of a connection can vary widely from the average.

15 Claims, 5 Drawing Sheets

METHODS OF ESTIMATING ROUTING DELAYS DURING THE PLACEMENT PROCESS IN PROGRAMMABLE LOGIC DEVICES

FIELD OF THE INVENTION

The invention relates to programmable logic devices (PLDs). More particularly, the invention relates to methods of estimating the probable delay of a signal in a PLD design prior to routing the signal in the PLD.

BACKGROUND OF THE INVENTION

Programmable logic devices (PLDs) are a well-known type of digital integrated circuit that can be programmed to perform specified logic functions. One type of PLD, the field programmable gate array (FPGA), typically includes an array of configurable logic blocks (CLBs) and programmable input/output blocks (IOBs). The CLBs and IOBs are interconnected by a programmable interconnect structure. Some FPGAs also include additional logic blocks with special purposes (e.g., DLLs, RAM, and so forth).

The interconnect structure typically includes a large number of routing resources such as interconnect lines (e.g., metal wires) running generally horizontally and vertically between the various logic blocks, and programmable interconnect points (PIPS) that selectively couple the interconnect lines to each other and to input and output pins of the logic blocks. Interconnect lines can span, for example, one CLB, two CLBs, six CLBS, half of the chip, and so forth. By enabling selected PIPs, two signals in two logic blocks can be interconnected via one or more of the interconnect lines.

The interconnect structure, CLBs, IOBs, and other logic blocks are typically programmed by loading a stream of configuration data into internal configuration memory cells that define how the interconnect structure and logic blocks are configured. The configuration data can be read from memory (e.g., an external PROM) or written into the FPGA by an external device. The collective states of the individual memory cells then determine the function of the FPGA. Thus, the process of implementing a user circuit in an FPGA essentially amounts to the production of a configuration data file that will elicit the desired behavior from the FPGA.

Figure 1:
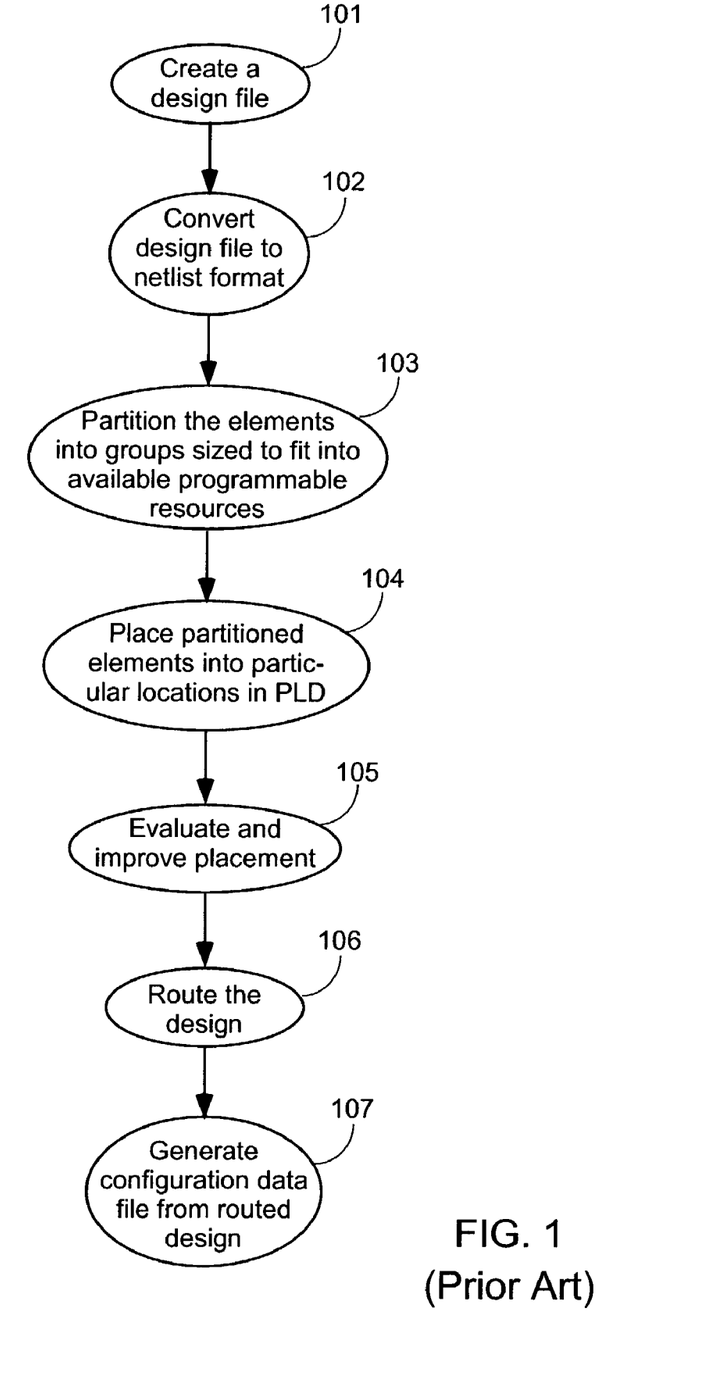
FIG. 1 illustrates the steps of a well-known method of implementing a user circuit in an FPGA.

The design implementation process involves a well-known series of steps, which are illustrated in FIG. 1. In step 101, a design file is created that includes a description of the elements included in the user circuit and how these elements are connected. The design file can be, for example, a file including a description of a schematic drawing or a file in HDL (Hardware Description Language) format. In step 102, the design file is converted (e.g., by a synthesis tool) to a netlist in a format understandable by the FPGA implementation tools. (A "netlist" is a description of a circuit comprising a list of low-level circuit elements or gates and the connections (nets) between these elements.) For example, FPGA implementation tools provided by Xilinx, Inc. accept netlist files in EDIF (Electronic Design Interchange Format) format.

In step 103, the FPGA implementation tools partition the elements recited in the netlist into groups of logic that will fit into the resources available in the FPGA. For example, a group of logic gates having up to four common input signals and a single output signal can be partitioned into a group of logic that will fit into a single 4-input lookup table.

The next step (step 104) is to place the partitioned elements into particular locations in the FPGA, e.g., into a specific configurable element of a specific CLB. The location assigned to each partitioned element can be, for example, randomly assigned and then gradually improved by swapping the placements and evaluating the results (step 105). The desirability of a particular placement can be graded based on several factors. One of these factors is the estimated speed of the design that will result after the next step (step 106), which is routing the interconnections between the various logic blocks. The routing step also typically involves a great deal of optimization. The final step, step 107, is to generate a configuration data file from the routed design.

Clearly, the actual speed of an implemented design is not known until after the routing step has been performed. However, the speed of interconnection paths between logic elements is often critical. Routing delays often determine the maximum operating frequency of a circuit. Therefore, during the placement optimization process (step 105) it is desirable to obtain the best possible estimate of routing delays consistent with the required software execution time.

The most accurate method of estimating a routing delay would be to actually route the design and then measure the delays using the timing analysis software that is readily available for routed FPGA designs. However, the estimation of routing delays might need to be performed thousands of times during the placement of a single design, and routing is a computationally intensive task that can be very time-consuming. Therefore, it is necessary to use faster techniques for estimating the routing delays of a particular prospective placement. However, it is also necessary to estimate the routing delays accurately, so the placement optimization process will result in a high-quality placement of the design, i.e., a placement that will operate at the desired frequency.

The method typically used to estimate routing delays during the placement optimization process is to generate a function for the estimated delay, as follows:

$$\text{Est. Delay} = \text{function}(dx, dy, \text{congestion}, \text{fanout})$$

where dx and dy are the distance in FPGA tiles from the source pin to the load pin for the connection for which the delay is being estimated. The value for congestion in the equation is a numerical measure of the congestion of nets in the area where the connection under consideration is being routed. The value for fanout in the equation is the fanout (i.e., the number of loads) of the net of which the connection is a part.

Typically, the estimated delay function is derived in an empirical fashion, by placing and routing several designs and measuring the delays. The function is then computed, usually by linear or non-linear regression, that most closely fits the distribution of the routing delays.

However, this known method of delay estimation has its drawbacks. There is generally a wide variation in the routing delays used to compute the function. Indeed, some FPGAs are now deliberately designed to provide a mixture of slow and fast interconnect. The slow interconnect is used for nets that are not speed-critical, and offers the advantage of using less surface area, e.g., it is not necessary to buffer these interconnect lines. The fast interconnect offers increased speed at the cost of consuming more surface area of the FPGA. Therefore, while a function calculated using average delays is indeed accurate on average, the function can be significantly inaccurate for any given connection.

Therefore, it is desirable to provide improved methods for estimating routing delays in an FPGA design implementation prior to actually routing the design.

SUMMARY OF THE INVENTION

The invention provides methods of estimating routing delays between two points in a programmable logic device (PLD). The invention takes advantage of the fact that there are a finite number of possible routes (routing paths) between any two points in a PLD. In PLDs with a regular and tiled structure, such as field programmable gate arrays (FPGAs), the number of routes between any two given points that are likely to be used by the router is relatively small. Thus, given the locations of the two points to be connected, the route most likely to be used by the router can be determined, and an associated delay can be calculated. This associated delay is then reported as the estimated routing delay.

This method of delay estimation is more accurate than previously-known methods, which calculated an average delay derived from existing designs. When the delays between possible paths vary widely, the actual delay of a connection can vary widely from the average.

One embodiment of the invention provides a method of determining an estimated routing delay of a connection between first and second points in a programmable logic device (PLD). The method includes: determining a set of possible routes between the first and second points; finding the most likely route of the possible routes; determining a delay associated with the most likely route; and reporting the delay associated with the most likely route as the estimated routing delay of the connection between the first and second points.

In some embodiments, the set of possible routes includes all possible routes between the first and second points. In other embodiments, only the most desirable routes are included in the set of possible routes. For example, as is well known, routing software is typically designed to try certain more desirable routes first. Therefore, the software module that determines the set of possible routes can be designed to use the same route-selecting algorithms that are used by the routing software. By using this method, it follows that the most desirable routes are included in the set of possible routes. In some embodiments, these most desirable routes are the N fastest routes between the first and second points, where N is a predetermined integer.

Finding the most likely of the possible routes can include, for example, evaluating the criticality of the connection, evaluating the amount of congestion in the area, and/or evaluating the fanout of the net comprising the connection.

BRIEF DESCRIPTION OF THE DRAWINGS

The present invention is illustrated by way of example, and not by way of limitation, in the following figures.

DETAILED DESCRIPTION OF THE DRAWINGS

The present invention is believed to be applicable to a variety of processes and software relating to implementing and/or evaluating user circuits in programmable logic devices (PLDs). The present invention has been found to be particularly applicable and beneficial when applied to the placement optimization process step of field programmable gate array (FPGA) implementation. While the present invention is not so limited, an appreciation of the present invention is presented by way of specific examples, in this instance with the estimation of routing delays during the placement optimization phase and prior to the routing phase of an FPGA implementation process.

In the following description, numerous specific details are set forth to provide a more thorough understanding of the present invention. However, it will be apparent to one skilled in the art that the present invention can be practiced without these specific details.

Figure 2:
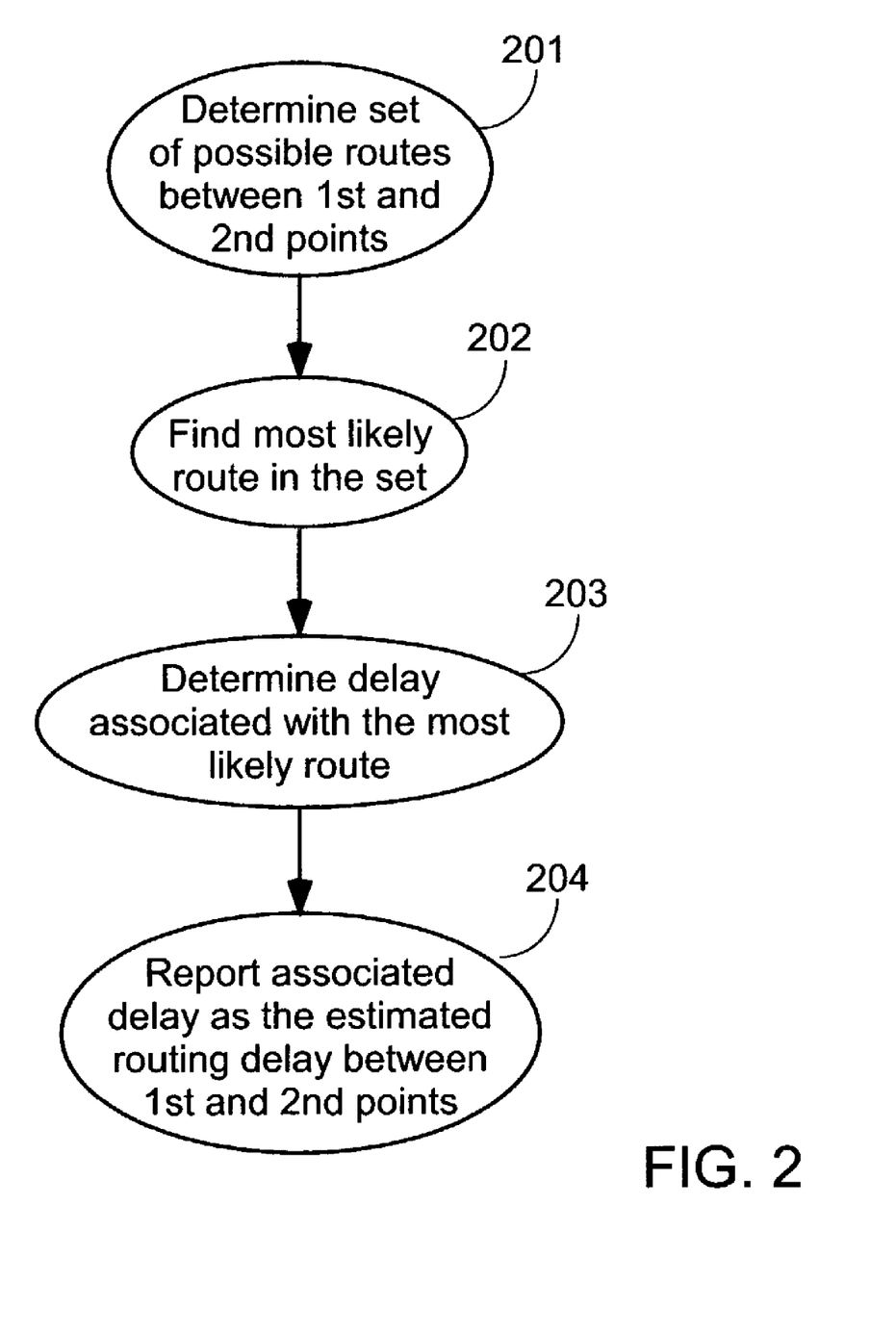
FIG. 2 illustrates the steps of a method of estimating a routing delay between two points in a PLD according to an embodiment of the invention.

FIG. 2 illustrates the steps of a method of estimating a routing delay between first and second points in a PLD. These steps can be performed, for example, during the placement optimization phase of a PLD implementation. In step 201, a set of possible routes between the first and second points is determined. The set of possible routes can include, for example, all possible routes between the first and second points. Determining a set of all possible routes is feasible in a tiled FPGA, where the location of each input and output terminal of each tile is known and predictable.

In other embodiments, only the most desirable routes are included in the set of possible routes. For example, the delay estimation software is likely to be generated by the same company that provides the routing software. Therefore, the algorithms used by the routing software to select a trial route are also likely to be available to the code developers writing the delay estimation software. Hence, the delay estimation software can be designed, for example, to include in the set of possible routes the first N trial routes that would be selected for evaluation by the routing software, where N is any desired integer. These routes might be, for example, the N fastest routes between the two points, which are easily determined in a PLD having a regular, tiled architecture.

However, after evaluation, the routing software does not necessarily select the obvious route, e.g., the fastest route between the two points. Therefore, it is necessary to narrow the possible routing choices to find the one route most likely to be finally selected by the router.

In step 202, the most likely route in the set of possible routes is found. The selection can be made based on various factors, e.g., the same factors that would be used by the router in evaluating possible routes. Finding the most likely of the possible routes can include, for example, evaluating the criticality of the connection, evaluating the amount of congestion in the area, and/or evaluating the fanout of the net comprising the connection. PLD routing software is well known to those of skill in the field, and each of these techniques is commonly used in the development of routing software.

In step 203, the delay associated with the most likely route is determined. This step can be accomplished in various ways. For example, in a regular and tiled PLD structure, there are a limited number of different routing elements within the basic tile. The delay of each element can be determined by experiment, and the delays can be stored in a file that can be accessed by a delay determining module in the delay estimation software. This technique is well known, and is commonly used, for example, by timing analysis software that is readily available for routed FPGA designs In step 204, the delay associated with the most likely route is reported as the estimated delay between the first and second points.

The method of FIG. 2 is particularly useful when the different routes in the set of possible routes have widely varying delays. As described above, some PLDs are now deliberately designed to include interconnect with widely varying delays. Therefore, it is now becoming particularly desirable to provide a delay estimation method that is not based on average values.

Figure 3:
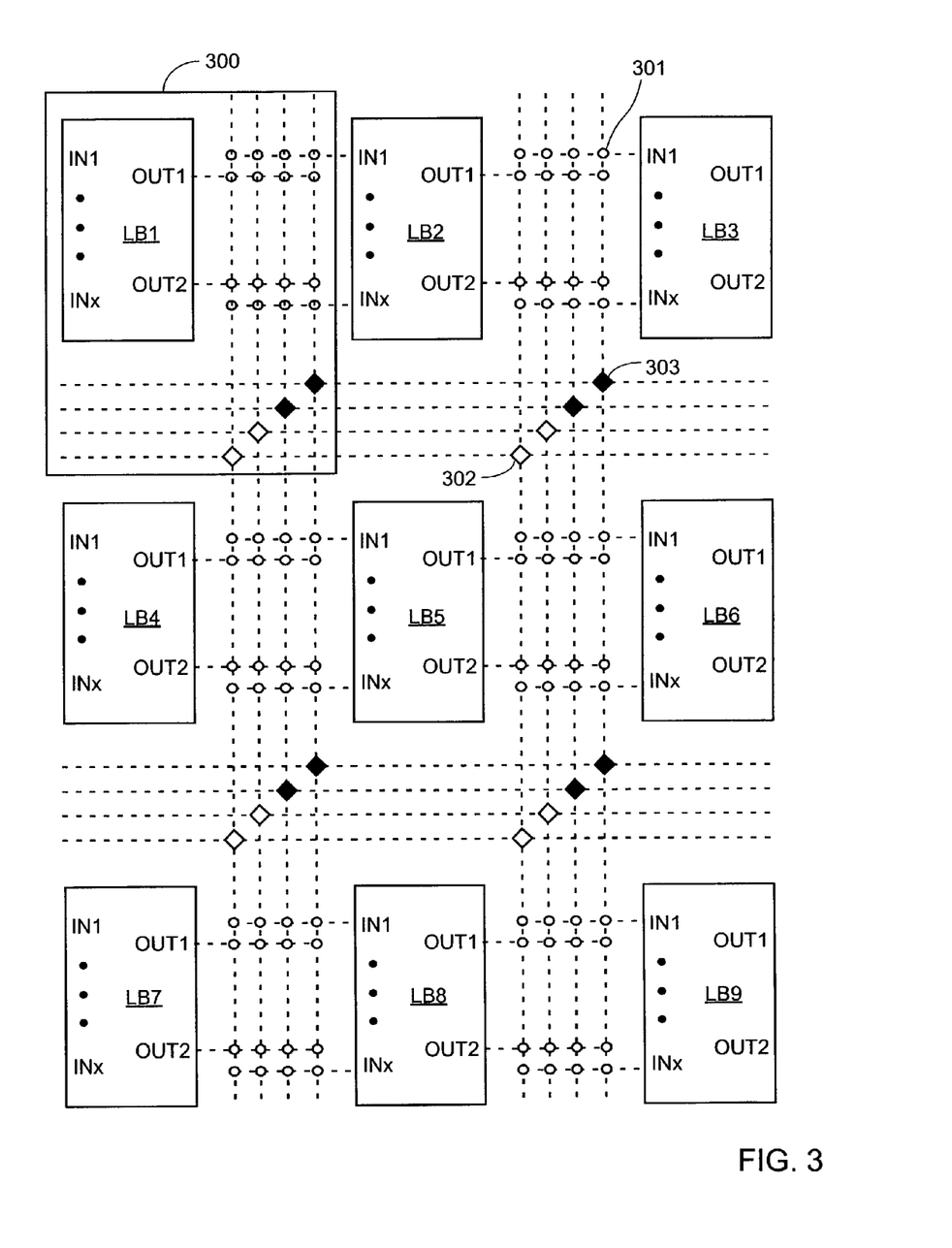
FIG. 3 shows an exemplary tiled architecture in an FPGA, to which the methods of the invention can be applied.
Figure 4:
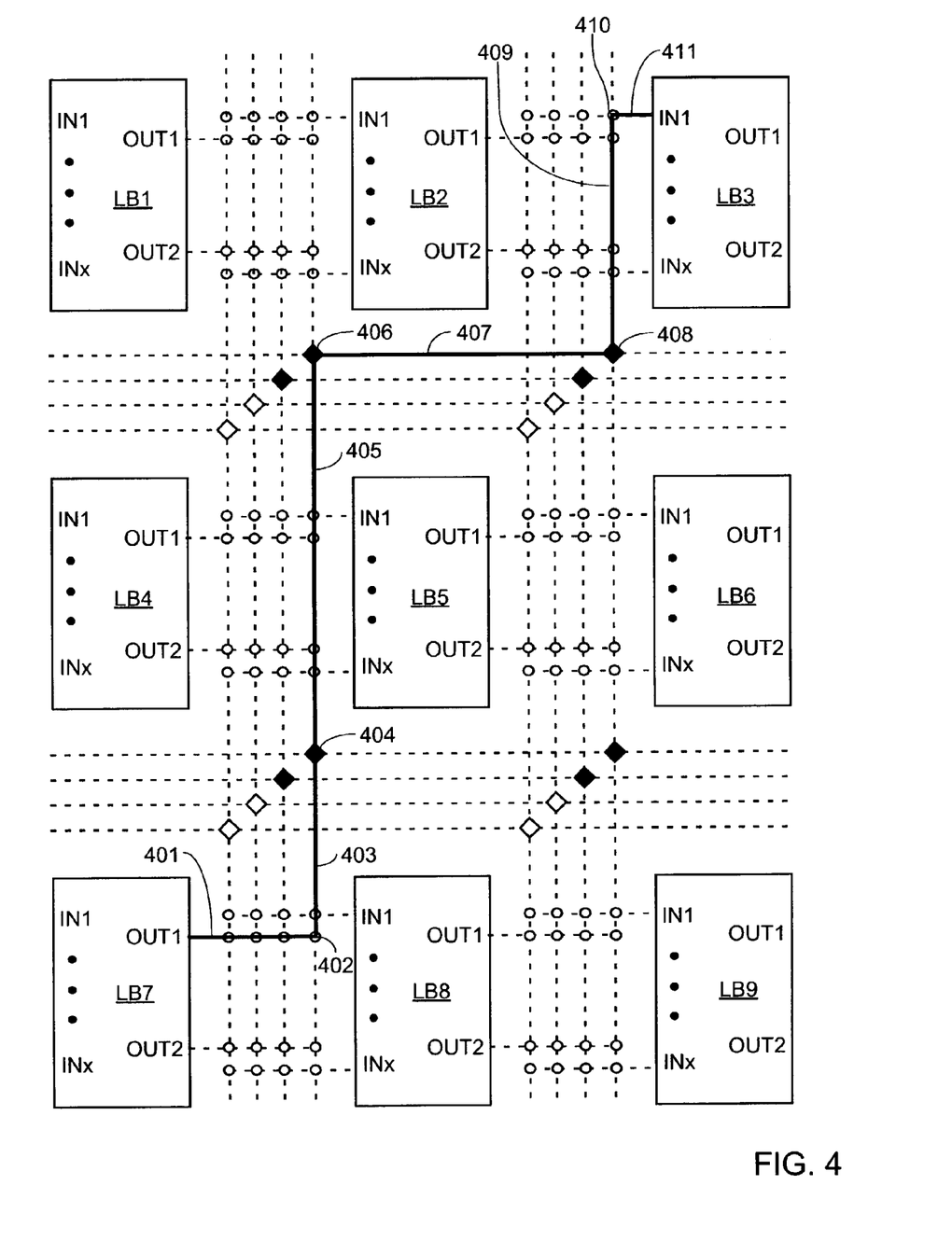
FIG. 4 illustrates a first possible route that can be used in the FPGA architecture of FIG. 3.
Figure 5:
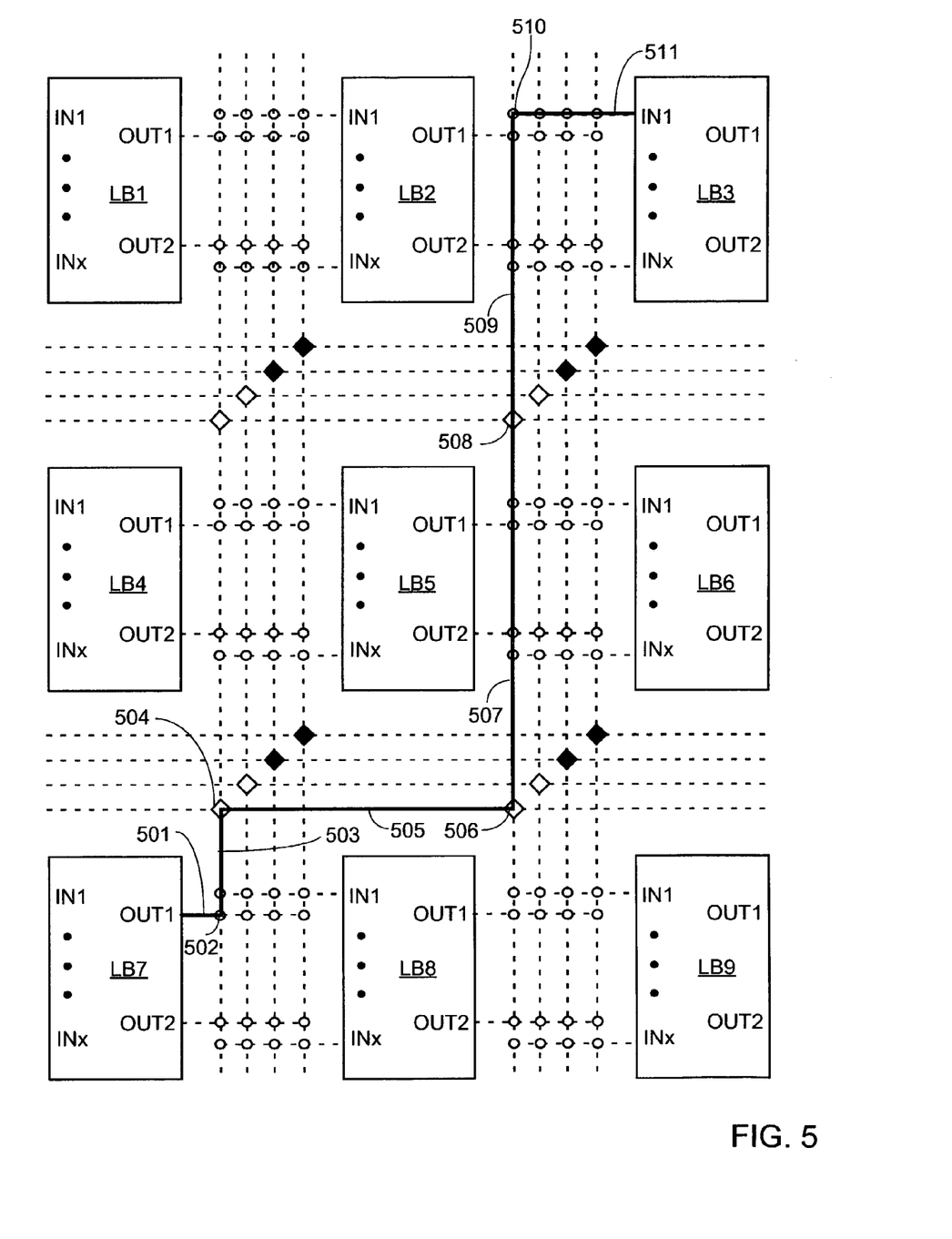
FIG. 5 illustrates a second possible route that can be used in the FPGA architecture of FIG. 3.

The delay estimation process is now explained using an exemplary routing task illustrated in FIGS. 3–5.

FIG. 3 is a simplified block diagram of an exemplary FPGA architecture. The FPGA of FIG. 3 includes a regular array of tiles. Each tile includes a logic block and associated routing, e.g., tile 300 includes a logic block LB1. The routing within each tile includes interconnect lines, shown as dotted lines in FIG. 3, and programmable interconnect points (PIPs) 301–303 that programmably couple the interconnect lines with each other and with input terminals (IN1–INx) and output terminals (OUT1, OUT2) of the logic blocks.

The exemplary FPGA of FIG. 3 includes three types of PIPS. PIP 301 is a one-way PIP that either connects the horizontal interconnect line to the vertical interconnect line, or allows the vertical line to pass through the PIP without delay. Thus, a collection of four PIPs 301 arranged in a horizontal row implements a multiplexer. One-way PIPs 301 are illustrated in FIGS. 3–5 as small open circles. PIP 302 is an unbuffered six-way PIP that programmably couples together any two of the four interconnect lines entering the PIP. Unbuffered PIPs 302 are illustrated in FIGS. 3–5 as open diamond shapes. PIP 303 is a buffered six-way PIP that programmably couples together any two of the four interconnect lines entering the PIP. Buffered PIPs 303 are illustrated in FIGS. 3–5 as solid diamond shapes. These PIPs are merely exemplary; the invention can be applied to PLD architectures including many other types of PIPs.

According to the method of FIG. 2, in step 201 a set of possible routes is determined between two points in the PLD. For example, suppose that the OUT1 output terminal of logic block LB7 (the first point) is to be connected to the IN1 terminal of logic block LB3 (the second point). In some embodiments, the N fastest routes between the first and second points will be included in the set, where N is a positive integer. In one embodiment, N is ten.

FIGS. 4 and 5 show two possible routes that might be included in such a set of possible routes. The route shown in FIG. 4 traverses interconnect line 401, one-way PIP 402, line 403, buffered six-way PIP 404, line 405, buffered six-way PIP 406, line 407, buffered six-way PIP 408, line 409, one-way PIP 410, and line 411. Note that the route shown in FIG. 4 passes through three buffered six-way PIPS, and no unbuffered six-way PIPs.

The route shown in FIG. 5 traverses interconnect line 501, one-way PIP 502, line 503, unbuffered six-way PIP 504, line 505, unbuffered six-way PIP 506, line 507, unbuffered six-way PIP 508, line 509, one-way PIP 510, and line 511. Note that the route shown in FIG. 5 passes through three unbuffered six-way PIPs, and no buffered six-way PIPS. The other eight routes selected in the presently-described embodiment might include, for example, some of each type of six-way PIP. Further, some of the nets might include some of the same routing resources (e.g., interconnect lines and PIPs) as other nets in the set.

Returning again to FIG. 2, in step 202, the most likely route in the set of possible routes is selected. Either of the routes shown in FIGS. 4 and 5 could be faster than the other route. Buffered PIPs tend to be faster for heavily-loaded nets, while unbuffered PIPs tend to be faster for lightly-loaded nets. Therefore, fanout (the number of loads on the net) can be a factor in determining which route is faster for a particular net. However, selecting the most likely route might not be as simple as selecting the fastest route, because speed is not the only factor evaluated by most routers in making a selection of how to route the net.

For example, routers typically take into consideration the amount of congestion on the route undergoing evaluation. Referring to FIG. 4, for example, the first and second rows of logic blocks (between logic blocks LB1–LB3 and logic blocks LB4–LB6) might be heavily used, which implies that the horizontal interconnect lines running between these rows of logic blocks will also be heavily congested. This factor would incline a typical router to avoid using interconnect line 407. Congestion estimators are well known in the art of designing routing software.

Another factor commonly considered by routers in selecting a route for a net is the criticality of the net, in other words, whether or not the speed of the net affects the overall operating frequency of the design. Criticality of a net can be determined, for example, by consulting timing constraints attached to the design by the circuit designer. Criticality evaluators are well known in the art of designing routing software.

In summary, when known methods are used to estimate the delay between two points in a PLD, the estimated delay is an average net delay of several different routes. Therefore, the reported delay might not be the same as the delay of any of the possible routes. However, when the methods of the invention are followed, a single one of the routes in the set (e.g., in the present example, the set of the ten fastest routes) is selected as the likeliest route, and the delay of the selected route is reported as the estimated delay. The selection of the likeliest route can be made using similar criteria to those that will be used by the routing software. However, because only one net is being evaluated, selecting the likeliest route is much faster than routing the design to determine the actual delay.

The methods of the present invention can be performed in either hardware, software, or any combination thereof, as those terms are currently known in the art. In particular, the present methods can be carried out by software, firmware, or microcode operating on a computer or computers of any type. Additionally, software embodying the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, and so forth). Further, such software can also be in the form of a computer data signal embodied in a carrier wave, such as that found within the well-known Web pages transferred among computers connected to the Internet. Accordingly, the present invention is not limited to any particular platform.

Those having skill in the relevant arts of the invention will now perceive various modifications and additions that can be made as a result of the disclosure herein. Accordingly, all such modifications and additions are deemed to be within the scope of the invention, which is to be limited only by the appended claims and their equivalents.

What is claimed is:

1. A processor-implemented method of placing a design in a programmable logic device (PLD), the method comprising:
   placing design elements at respective locations on the PLD in a memory-based representation of the PLD;
   determining a set of a plurality of possible routes between at least one first point and at least one second point of placed elements;
   finding one most likely route of the plurality of possible routes;
   wherein the one most likely route is found based on a timing constraint associated with a connection between the first and second points, a numbers of nets in an area covering the possible routes, and fanout of a net including the connection between the first point and the second point;
   determining a delay associated with the most likely route;
   reporting the delay associated with the most likely route as the estimated routing delay of the connection between the first and second points;
   wherein the determining of the plurality of possible routes, finding the one most likely route, determining the delay, and reporting the delay are performed during placement optimization, and the most likely route is not assigned as a route of the design during placement optimization; and
   in response to the estimated routing delay failing to satisfy a requirement, changing placement locations of one or more elements of the design, and repeating the steps of determining the plurality of possible routes, finding the one most likely route, determining the delay, and reporting the delay during placement optimization.

2. The method of claim 1, wherein determining a set of possible routes between the first and second points comprises determining a set of routes between the first and second points having widely varying delays.

3. The method of claim 1, wherein determining a set of possible routes between the first and second points comprises determining a set of all possible routes between the first and second points.

4. The method of claim 1, wherein determining a set of possible routes between the first and second points comprises determining the N fastest routes between the first and second points, where N is a predetermined integer.

5. The method of claim 1, wherein the PLD is a field programmable gate array (FPGA).

6. An article of manufacture, comprising:
   a computer-readable storage medium having stored thereon, computer-executable code for placing a design in a programmable logic device (PLD), the code including instructions that when executed by a computer perform the steps including,
   placing design elements at respective locations on the PLD in a memory-based representation of the PLD;
   determining a set of a plurality of possible routes between at least one first point and at least one second point of placed elements;
   finding the one most likely route of the plurality of possible routes;
   wherein the one most likely route is found based on a timing constraint associated with a connection between the first and second points, a number of nets in an area covering the possible routes, and fanout of a net including the connection between the first point and the second point;
   for determining a delay associated with the most likely route;
   reporting the delay associated with the most likely route as the estimated routing delay of the connection between the first and second points;
   wherein the determining of the plurality of possible routes, finding the one most likely route, determining the delay, and reporting the delay are performed during placement optimization, and the most likely route is not assigned as a route of the design during placement optimization; and
   in response to the estimated routing delay failing to satisfy a requirement, changing placement locations of one or more elements of the design, and repeating the steps of determining the plurality of possible routes, finding the one most likely route, determining the delay, and reporting the delay during placement optimization.

7. The article of manufacture of claim 6, wherein the code for determining a set of possible routes between the first and second points comprises code for determining a set of routes between the first and second points having widely varying delays.

8. The article of manufacture of claim 6, wherein the code for determining a set of possible routes between the first and second points comprises code for determining a set of all possible routes between the first and second points.

9. The article of manufacture of claim 6, wherein the code for determining a set of possible routes between the first and second points comprises code for determining the N fastest routes between the first and second points, where N is a predetermined integer.

10. The article of manufacture of claim 6, wherein the PLD is a field programmable gate array (FPGA).

11. A computer system for placing a design in a programmable logic device (PLD), comprising:
   at least one processor configured to execute,
      a placement module for placing design elements at respective locations on the PLD in a memory-based representation of the PLD;
      a route determining module for determining a set of a plurality of possible routes between at least one first point and at least one second point of placed elements;
      a finding module for finding one most likely route of the plurality of possible routes between the at least one first point and the at least one second point;
      wherein the one most likely route is found based on a timing constraint associated with a connection between the first and second points, a number of nets in an area covering the possible routes, and fanout of a net including the connection between the first point and the second point;
      a delay determining module for determining a delay associated with the most likely route;
      a reporting module for reporting the delay associated with the most likely route as the estimated routing delay of the connection between the first and second points;
      wherein the determining of the plurality of possible routes, finding the one most likely route, determining the delay, and reporting the delay are performed by the modules during placement optimization, and the most likely route is not assigned as a route of the design during placement optimization; and
      the placement module, responsive to the estimated routing delay failing to satisfy a requirement, changes placement locations of one or more elements of the design, and the determining of the plurality of possible routes, finding the one most likely route, determining the delay, and reporting the delay during placement optimization are performed by the modules for the changed placement locations.

12. The computer system of claim 11, wherein the route determining module determines a set of possible routes between the first and second points by determining a set of routes between the first and second points having widely varying delays.

13. The computer system of claim 11, wherein the route determining module determines a set of possible routes between the first and second points by determining a set of all possible routes between the first and second points.

14. The computer system of claim 11, wherein the route determining module determines a set of possible routes between the first and second points by determining a set of the N fastest routes between the first and second points, where N is a predetermined integer.

15. The computer system of claim 11, wherein the PLD is a field programmable gate array (FPGA).

* * * * *